(12) United States Patent
Cox et al.

(10) Patent No.: US 11,739,671 B2
(45) Date of Patent: Aug. 29, 2023

(54) SYSTEMS AND METHODS FOR PROVIDING A HEATING CYCLE TO AN AFTER-TREATMENT SYSTEM OF A VEHICLE

(71) Applicant: Ford Global Technologies, LLC, Dearborn, MI (US)

(72) Inventors: David Cox, London (GB); David Hesketh, Ingatestone (GB); Themi Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 17/242,564

(22) Filed: Apr. 28, 2021

(65) Prior Publication Data

US 2022/0349328 A1   Nov. 3, 2022

(51) Int. Cl.
*F01N 3/20* (2006.01)
*B60W 10/06* (2006.01)
*B60W 10/08* (2006.01)
*B60W 20/40* (2016.01)
*B60W 20/16* (2016.01)

(52) U.S. Cl.
CPC ........... *F01N 3/2013* (2013.01); *B60W 10/06* (2013.01); *B60W 10/08* (2013.01); *B60W 20/16* (2016.01); *B60W 20/40* (2013.01); *F01N 3/2026* (2013.01); *B60W 2510/30* (2013.01); *B60W 2710/30* (2013.01)

(58) Field of Classification Search
CPC ................. F01N 3/2013; F01N 3/2026; F01N 2900/0602; F01N 2900/08; F01N 2900/1602; F01N 2240/16; F01N 2900/10; F01N 2900/104; F01N 9/00; B60W 10/06; B60W 10/08; B60W 20/16; B60W 20/40; B60W 2510/30; B60W 2710/30; B60K 6/485; B60K 2006/268; B60K 6/26; Y02A 50/20; Y02T 10/12
See application file for complete search history.

(56) References Cited

U.S. PATENT DOCUMENTS

| | | | |
|---|---|---|---|
| 7,769,505 B2 | 8/2010 | Rask et al. | |
| 8,437,898 B2 | 5/2013 | Hashimoto | |
| 8,727,050 B2 * | 5/2014 | Roos | B60W 30/192 |
| | | | 180/309 |
| 9,493,153 B2 | 11/2016 | Hashimoto | |

FOREIGN PATENT DOCUMENTS

GB   2581774   9/2020

* cited by examiner

*Primary Examiner* — Brandon D Lee
(74) *Attorney, Agent, or Firm* — Haley Guiliano LLP

(57) ABSTRACT

A method of providing a heating cycle for an after-treatment system is described. The method comprises initiating a pre-charge cycle of a DCDC converter and determining a temperature of the after-treatment system. In response to determining the temperature of the after-treatment system is below a threshold temperature and the pre-charge is complete, the method further comprises operating a solid-state switch to electrically connect a high voltage power source to a heating element to of the after-treatment system, and heating the after-treatment system with the heating element until the after-treatment system reaches the threshold temperature.

17 Claims, 8 Drawing Sheets

SYSTEMS AND METHODS FOR PROVIDING A HEATING CYCLE TO AN AFTER-TREATMENT SYSTEM OF A VEHICLE

BACKGROUND

The present disclosure relates to systems and methods for controlling a heating element for providing heat to an engine after-treatment system, more particularly, but not exclusively, to systems and methods related to selectively providing a heating cycle to a catalytic converter prior to engine start.

SUMMARY

Through consumer demand and local regulation, the need for reduced engine emissions has led to engine exhaust systems that comprise catalytic converters. Catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be most effective. As the demand for cleaner emissions increases and legislation requires a reduction in the pollutants produced by internal combustion engines, solutions involving exhaust after-treatment systems are increasingly desired.

According to examples in accordance with an aspect of the invention, there is provided a method of providing a heating cycle for an after-treatment system, e.g., of a vehicle. The method comprises receiving a start trigger, initiating a pre-charge cycle of a DC-DC converter, and determining the temperature of the after-treatment system. In response to determining the temperature of the after-treatment system is below a threshold temperature and determining that the pre-charge is complete, the method further comprises operating a solid-state switch to electrically connect a high voltage power source, e.g., a high voltage battery, to a heating element of the after-treatment system, and heating the after-treatment system using the heating element until the after-treatment system reaches the threshold temperature. In some examples, the high voltage power source may be connected directly to the heating element of the after-treatment system, or indirectly, e.g., by virtue of one or more other devices.

In some examples, the method further comprises starting an engine, e.g., in a delayed response to the start trigger. In some examples, the engine is started after the after-treatment system reaches the threshold temperature. In some examples, the method further comprises providing an auxiliary power before an engine start. For example, one or more electrical devices, e.g., high voltage electrical devices, may be connected to a high voltage power source (e.g., a high voltage power source having a voltage greater than 12V, such as 48V). In some examples, the one or more electrical devices may be configured to receive auxiliary power from the high voltage power source prior to an engine start, e.g., after and/or in response to the start trigger, and prior to the engine start. That is to say that the high voltage power source may supply power to one or more electrical devices, such as a power tool and/or a domestic appliance (and/or any other appropriate external device connectable to a vehicle), from the high voltage power supply, e.g., prior to engine start. In some examples, the engine is started while the one or more high voltage devices are receiving power. In some examples, the start trigger may be at least one of a signal received from a key fob, a door of a vehicle opening, a signal received from a smart device application, an engine start request, and/or detecting a proximity of a user. In some examples, the method further comprises closing an e-switch of a power source to electrically connect the power source to the after-treatment system. In some examples, the high voltage power source is a power source of a hybrid electric vehicle (HEV), e.g., a hybrid battery.

In some examples, the method further comprises determining a plurality of contextual factors. In some examples, an amount of thermal energy provided to the after-treatment system by the auxiliary heat source is based on the contextual factors. The contextual factors may be at least one of an ambient temperature, a time since a last engine start-up, a delta temperature between the temperature of the after-treatment system and the ambient temperature, an engine temperature, a maximum power output from the auxiliary heat source, a maximum thermal energy output from the heat source, a target temperature for the after-treatment system, or a state of charge of the power source. In some examples, in response to the after-treatment system reaching a target temperature, the method comprises starting an engine.

In some examples, the method further comprises determining a state of charge of a high voltage power source, e.g., an energy storage device of a hybrid vehicle. In some examples, the method further comprises modifying a minimum state of charge of the high voltage power source to enable a next heating cycle of the heating element. Modifying the minimum state of charge may comprise elevating a minimum amount of charge to be held within the high voltage power source. For example, modifying the minimum state of charge may comprise changing the energy stored within a hybrid system energy storage device, such as a hybrid vehicle battery.

In response to receiving the start trigger, in some examples, the method further comprises initializing at least one vehicle system, such as a battery energy control module, an auxiliary device, an e-machine, or an engine control module. In some examples, the method further comprises initializing two or more vehicle systems in parallel. In some examples, the method further comprises, in response to the after-treatment system reaching a target temperature, starting an engine.

In some examples, the power source, e.g. a hybrid vehicle's battery, comprises an e-switch, which can replace a conventional mechanical contactor found in HEVs. Accordingly, the method may further comprise operating a pulse-width modulation (PWM) switch and/or DC-DC converter. In some examples, the eCAT comprises an additional independent switch. For example, a PWM switch or a separate, e.g., additional, DC-DC converter, which can modulate power from the high voltage power source to the eCAT. In some examples, the e-switch is operable to electrically connect an eCAT, and/or an auxiliary device, to the power source, e.g., after receiving the start trigger and prior to engine start.

According to a second example in accordance with an aspect of the invention, there is provided an exhaust system suitable for use with an engine. The exhaust system comprises an after-treatment system and an exhaust control module configured to receive a start trigger, initiate a pre-charge cycle of a DCDC converter, and/or determine a temperature of the after-treatment system, either by itself or in combination with one or more other control modules. In response to determining that the temperature of the after-treatment system is below a threshold temperature and determining the pre-charge is complete, the exhaust control module is further configured to operate a solid-state switch to electrically connect a high voltage power source to a heating element of the after-treatment system, and heat the after-treatment system using the heating element until the after-treatment system reaches the threshold temperature.

According to a third example in accordance with an aspect of the invention, there is provided a vehicle. The vehicle comprises an engine and an exhaust system. The exhaust system comprises an after-treatment system, an exhaust control module configured to receive a start trigger, initiate a pre-charge cycle of a DC-DC converter, and determine a temperature of the after-treatment system. In response to determining that the temperature of the after-treatment system is below a threshold temperature and determining the pre-charge is complete, the exhaust control module is further configured to operate a solid-state switch to electrically connect a high voltage power source to a heating element of the after-treatment system, and heat the after-treatment system using the heating element until the after-treatment system reaches the threshold temperature.

In some examples, the power source, e.g. a hybrid vehicle's battery, comprises an e-switch to replace a conventional mechanical contactor, such as that found in HEVs. The e-switch electrically connects an eCAT, and/or an auxiliary device, to the power source prior to engine start, which is not possible when using a mechanical contactor in some circumstances. In some examples, the control module further comprises closing an e-switch of a power source to electrically connect the power source to the after-treatment system. In some examples, the high voltage power source is a hybrid system power source, such as a battery.

In some examples, the eCAT comprises an additional independent switch. For example, a PWM switch and/or a separate DC-DC converter, to modulate power from the high voltage power source to the eCAT.

According to a fourth example in accordance with an aspect of the invention, there is provided a non-transitory computer-readable medium having instructions encoded thereon for carrying out a method, the method comprising the method as described herein. In some examples, the method comprises receiving a start trigger, initiating a pre-charge cycle of a DC-DC converter, and determining the temperature of the after-treatment system. In response to determining the temperature of the after-treatment system is below a threshold temperature and determining that the pre-charge is complete, the method further comprises operating a solid-state switch to electrically connect a high voltage power source (e.g., a hybrid system power source, such as a battery) to a heating element of the after-treatment system, and heating the after-treatment system with the heating element until the after-treatment system reaches the threshold temperature. In some examples, the method further comprises closing an e-switch of a power source to electrically connect the power source to the after-treatment system.

According to a fifth example in accordance with an aspect of the invention, there is provided a method of pre-heating a catalyst of an aftertreatment system, the method comprising, in response to receiving a trigger, operating a solid-state switch to electrically couple a heating element to a power source prior to starting an engine to which the aftertreatment system is coupled. For example, electrically coupling the heating element to the power source may comprise: operating an e-switch, to electrically connect the power source (e.g., a HEV battery) to a power net (or power bus) of a HEV; and operating a pulse-width modulation switch, to modulate the power to the heating element from the power source.

For the avoidance of doubt, the system and methods for providing a heating cycle for an after-treatment system, according to any of the examples described herein, may be used to improve the emissions of a vehicle. Whilst the benefits of the heating cycle may be described by reference to hybrid vehicles or mild hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize a catalytic converter, such as electrical generators, mining equipment, stoves, and gas heaters.

These examples and other aspects of the invention will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which.

DETAILED DESCRIPTION

Figure 1A:
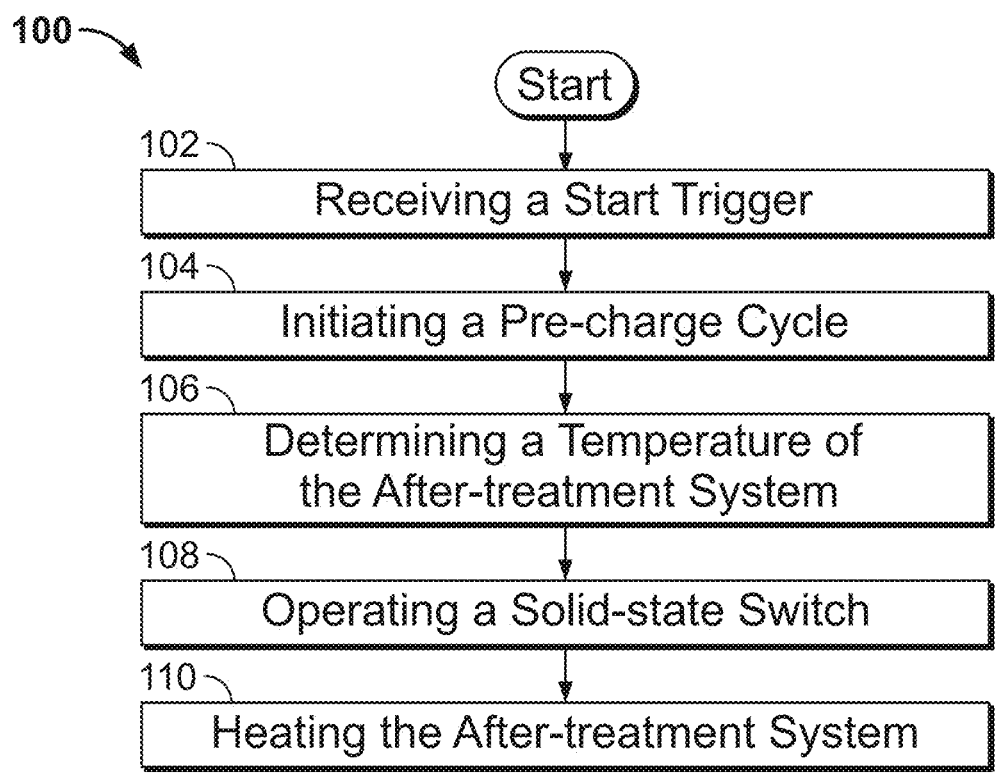
FIGS. 1A and 1B illustrate example flow charts of similar methods for providing a heating cycle for an after-treatment system of a vehicle, in accordance with at least one of the examples described herein.

It should be understood that the detailed description and specific examples herein while indicating exemplary embodiments, are intended for purposes of illustration only and are not intended to limit the scope of the invention. These and other features, aspects, and advantages of the present invention will become better understood from the following description, appended claims, and accompanying drawings. It should be understood that the Figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV) or any other vehicle having a fuel tank and a electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as the European Union (EU), North America, and the United Kingdom (UK), the increased efficiencies of hybrid vehicles may be insufficient to satisfy new emission standards.

One solution to reduce the toxic emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, and catalytic converters.

Electronically heated catalysts, or eCATs, are a type of catalytic converter, which have been in use for a number of years. An eCAT typically comprises a heating element disposed within, or near to, a catalyst. However, eCATs take time to reach an optimum temperature and peak efficiency. One solution is to preheat an eCAT to its optimum temperature and assist with catalyst light off. The time it takes to warm up the catalyst after engine start can be critical to the success of meeting the emissions standard. Therefore, in an ideal scenario, the eCAT is preheated prior to engine start so that the eCAT is at peak efficiency and the emissions of the engine are reduced without having to wait for the catalyst to warm up. In this way, the emissions can be compliant with local regulations from the moment the engine is started.

However, supplying electrical energy to power the eCAT is not possible with the current system architecture in HEVs, nor without a mechanism to transfer the thermal energy from the eCAT to the catalyst. For example, mHEV system architectures cannot supply the eCAT with electrical energy until after the engine has been started via the low voltage (e.g., 12V) system and has achieved a normal 'running' state. This is because the hybrid battery mechanical relay contactor must remain open until after the 12V system has cranked the engine, due to the risk that the current required to crank the engine (discharged from the 12V system) may lead to a brief voltage drop in the 12V system that causes the high voltage (e.g., a hybrid system battery) relay contactor to chatter and arc, potentially welding it closed and damaging the engine system.

Accordingly, the systems and methods described herein address the system architecture, in particular the start-up/power-up procedure of hybrid vehicles, to enable hybrid battery power prior to engine start. The systems and methods described herein also address the mechanical contactor of the hybrid battery pack of the described mHEV or HEV system architectures, which do not enable heating prior to the engine start (i.e., pre-heating). For the avoidance of doubt, any of, or at least any part of, the system architectures described below may be implemented in any appropriate hybrid vehicle, and are not limited to implementation in any one type of hybrid vehicle.

In accordance with at least one of the examples described herein, the new power-up sequence decouples the hybrid system power-up from the low voltage (e.g., 12V) system prior to the engine crank. In some examples, a solid-state switch enables the hybrid system to 'power-up' as soon as a trigger event is detected, as will be described in more detail with reference to the figures, below.

FIG. 1A illustrates an example flow chart of a process 100 for providing a heating cycle for an after-treatment system of a vehicle, in accordance with at least one of the examples described herein. Process 100 starts at step 102 when a start trigger is received. In some examples, a start trigger may be any one or more of a signal received from a key fob, a door of a vehicle opening, a signal received from a smart device application, a signal received from an auxiliary device connected to the power source, an engine start request, or detecting a proximity of a user.

At step 104, a pre-charge cycle of a DC-DC converter is initiated. At step 106, a temperature of the after-treatment system is determined. In some examples, one or more other contextual factors may also be determined. In such examples, an amount of thermal energy provided to the after-treatment system by the heating element is based on the one or more contextual factors. For example, if an ambient temperature of the environment of the after-treatment system is very low, more thermal energy may be needed to be supplied to the heating element to ensure that the after-treatment system is sufficiently preheated. The contextual factors may comprise at least one of an ambient temperature, a time since a last engine start-up, a delta temperature between the temperature of the after-treatment system and the ambient temperature, an engine temperature, a maximum power output from the auxiliary heat source, a maximum thermal energy output from the heat source, a target temperature for the after-treatment system, or a state of charge of the power source.

At step 108, a solid-state switch is operated. In some examples, the solid-state switch is a metal-oxide-semiconductor field-effect transistor (MOSFET) or other suitable solid-state relay-based technology. In some examples, the solid-state switch electrically connects a the high voltage power source. In this way, power to the heating element of the after-treatment system is provided prior to engine start. In some examples, power to an auxiliary system may also be provided prior to the engine start. The auxiliary system may supply power to a range of devices from power tools to domestic appliances.

At step 110, the after-treatment system is heated. In some examples, the after-treatment system includes an eCAT and a catalyst. The after-treatment system is heated until it reaches a threshold temperature, which may be the same temperature as the most efficient temperature of the catalyst, e.g., for a given operating condition. In some examples, the threshold temperature may be above the most efficient temperature of the catalyst, to allow for some cooling effects between ending the heating of the after-treatment system and starting an engine. In some examples, the threshold temperature may be below the most efficient temperature of the catalyst, to allow for heating from the engine exhaust to bring the catalyst up to its most efficient temperature.

In some examples, heating of the catalyst of the after-treatment system may be reliant, at least in part, upon airflow passing over the heating element to transfer the thermal energy to the catalyst and to protect the element from overheating. Therefore, prior to engine start and thus without the exhaust gas flow of a running engine, a pump may be added to the system to enable the transfer of thermal energy from the eCAT to the catalyst by generating airflow in the exhaust to transfer the thermal energy from the heating element to the catalyst. In some examples, this may include adding a pump to the exhaust gas recovery (EGR) circuit, or utilizing (or repurposing) an e-compressor of the vehicle.

Figure 1B:
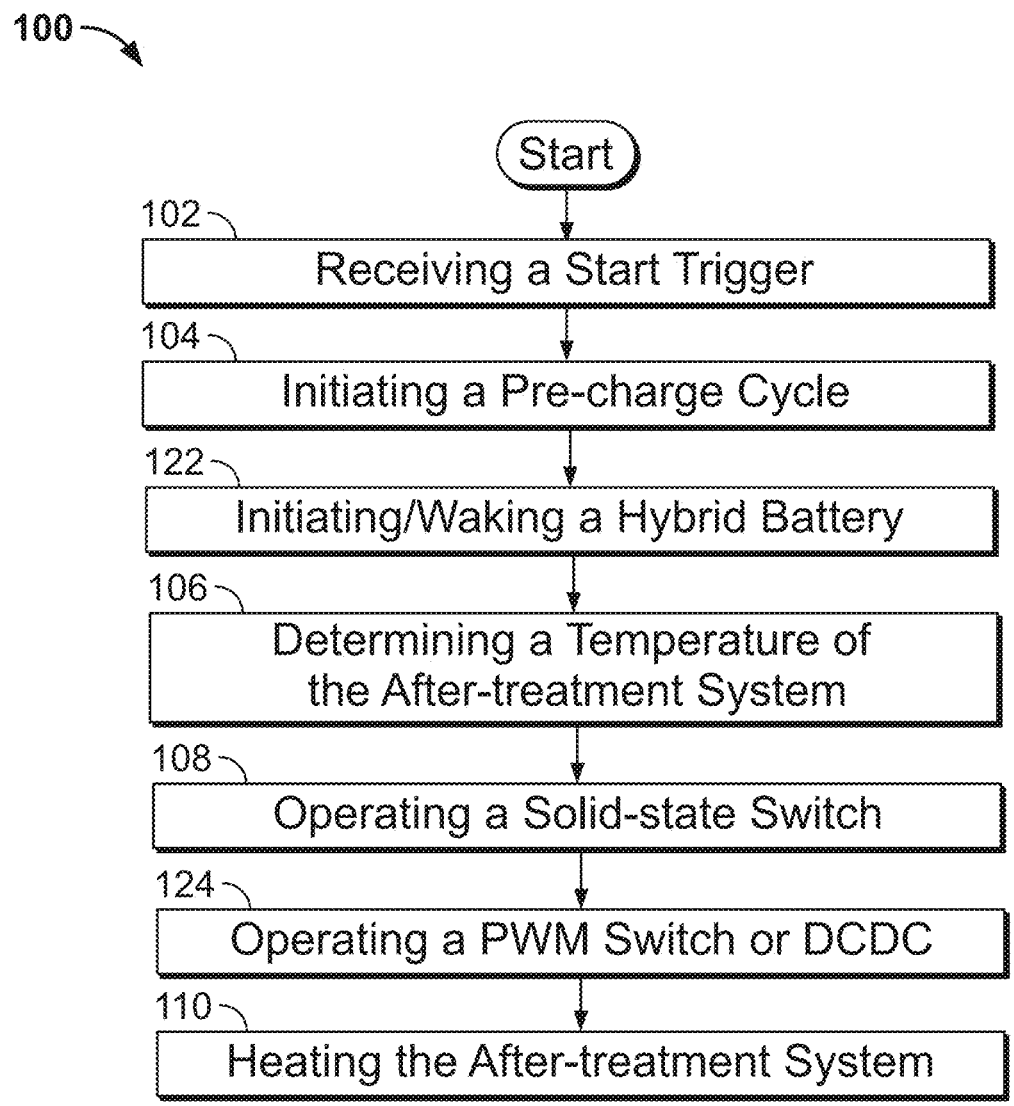

FIG. 1B illustrates an example flow chart of an alternate process 100 for providing a heating cycle for an after-treatment system of a vehicle, in accordance with at least one of the examples described herein. As illustrated in FIG. 1B, process 100 may further comprise additional steps 122 and 124. After step 104, wherein a pre-charge cycle of a DC-DC converter is initiated, the process 100 may continue on to step 122. At step 122, a hybrid battery of a HEV is initiated. In some examples, the hybrid battery may be in a sleep mode, therefore, at step 122, the hybrid battery is woken.

After step 108, wherein a solid-state switch is operated, as described above, the process 100 may continue on to step 124. At step 124, a pulse-width modulation (PWM) switch is operated to modulate power from the power source to the heating element of the after-treatment system. In some examples, the after-treatment system may comprise an additional DC-DC converter rather than a PWM switch, therefore, at step 124, the DC-DC converter is operated. For example, electrically coupling the heating element to the power source may comprise: operating an e-switch, to electrically connect the power source (e.g., a HEV battery) to a power net (or power bus) of a HEV; and operating a pulse-width modulation switch, to modulate the power to the heating element from the power source. In some examples, it is step 124 that activates an eCAT to provide thermal energy to the after-treatment system.

Figure 2:
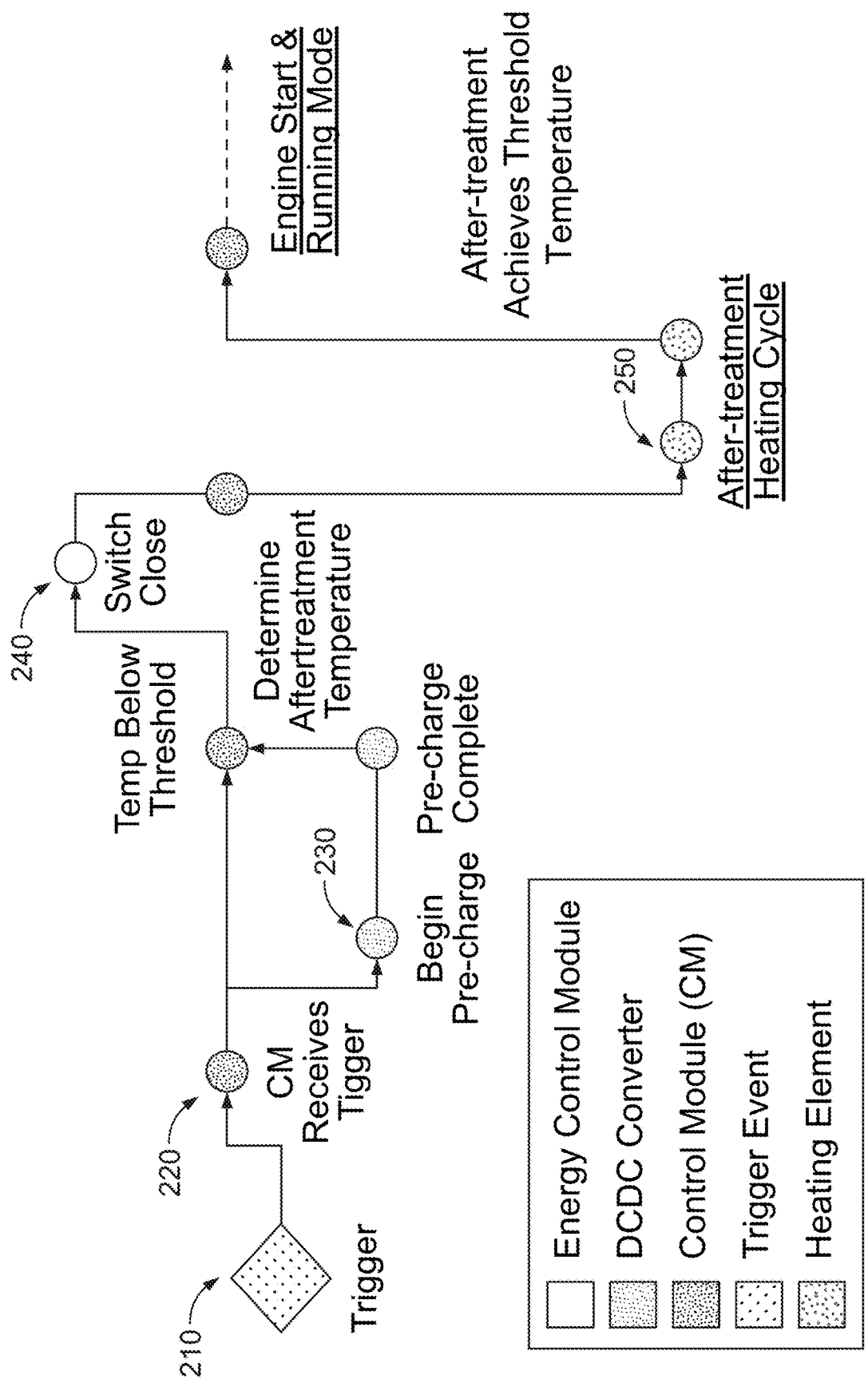
FIG. 2. illustrates an example hybrid system power-up sequence, in accordance with at least one of the examples described herein.

FIG. 2. illustrates an example hybrid system power-up sequence 200, in accordance with at least one of the examples described herein. As shown, after a trigger event 210 is received, a control module 220, such as an engine control module or power control module, receives a signal that indicates a trigger event 210 has occurred. The control module 220 may be electronically connected to a DC-DC converter 230, an energy control module 240, and an auxiliary heat source 250.

In some examples, after receiving a signal indicating a trigger event has occurred, the control module 220 then sends a signal to the DC-DC converter 230 to begin a pre-charge. After the pre-charge is complete, the control module 220 then measures a temperature of an after-treatment system. In some examples, the after-treatment system is an eCAT. In response to the temperature of the after-treatment system being below a threshold and the pre-charge cycle completing, the control module 220 sends a signal to the energy control module 240 (e.g. a battery energy control module (BECM)) to operate an e-switch. In some examples, the e-switch is a solid-state based relay switch, such as a MOSFET. The closing of the switch connects the high voltage power source to a bus of the vehicle, enabling the use of the vehicle's high voltage power source prior to the engine start. In some examples, the high voltage power source may be a hybrid vehicle battery, such as a 48V HEV battery.

Once the control module 220 has sent a signal to the energy control module 240 to close the switch and electronically connect the high voltage power source to the bus, a signal is sent to the auxiliary heat source 250 to provide heat to the after-treatment cycle. In some examples, the control module 220 controls the auxiliary heat source 250 and regularly measures the current temperature of the after-treatment system until the threshold temperature is met. After the threshold temperature is met, the control module 220 enables the engine to start and the normal running mode of the engine continues. In some examples, the control module 220 commands a heating element PWM switch or secondary DC-DC converter connected to the after-treatment system to activate an eCAT and consume power now that the power source is connected.

Figure 3:
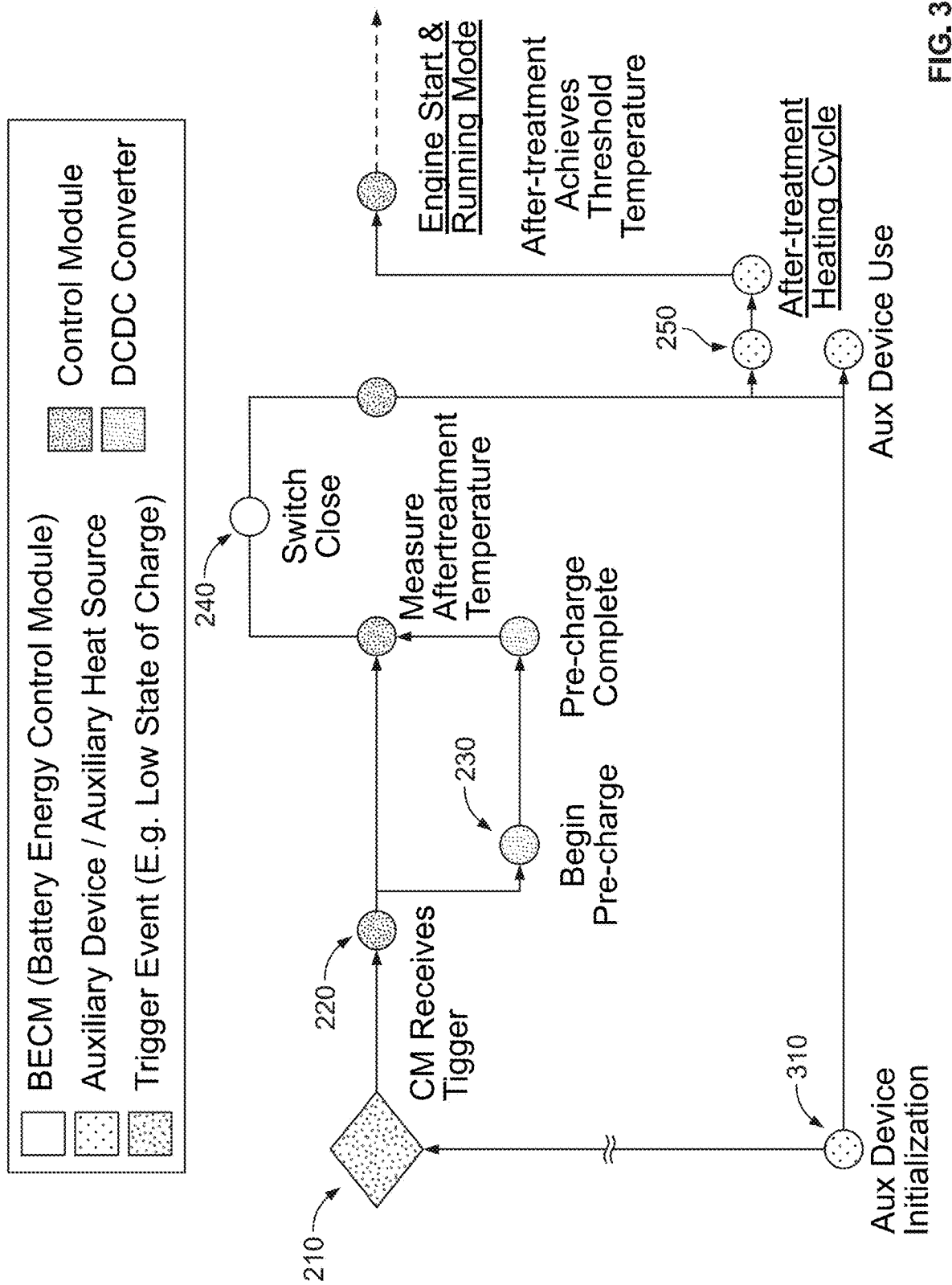
FIG. 3. illustrates an example hybrid system power-up sequence, in accordance with at least one of the examples described herein.

FIG. 3. illustrates an example hybrid system power-up sequence 300, in accordance with at least one of the examples described herein. As shown, the hybrid system power-up sequence is similar to that shown in FIG. 2, however an additional auxiliary device 310 is shown as already initialized. In some example, power can only be drawn from the hybrid battery once the battery e-switch is closed. Step 310 may include initialization of an auxiliary device. However, the auxiliary device may be unable to draw power as the hybrid battery is yet to be connected to the hybrid system, which may occur once the battery e-switch is closed. The auxiliary device 310 may be any device that can operate directly from the hybrid energy source or any device that would operate after an inverter converts the direct current (DC) supply to an alternating current (AC) supply, such as power tools, domestic appliances, or the like. The auxiliary device 310 draws power from the high voltage power source when the rest of the system is offline. That is to say that, the engine is not running and a trigger event has yet to be received by the system (e.g., prior to engine start).

In some examples, the solid-sate switch is closed 240 and the auxiliary device 310 can draw power prior to the engine after-treatment heating cycle (and engine start). In some examples, the auxiliary device 310 can draw power and be used nominally in parallel to the after-treatment cycle 250.

In some examples, a state of charge of a high voltage power source is determined. In some examples, the auxiliary device 310 reduces the state of charge (SOC) of the high voltage power source to a level approaching the minimum SOC required to enable the heating cycle of the after-treatment system as described above. In some examples, when the SOC of the power source approaches the minimum level and the auxiliary device would, if it continues to draw power, reduce the SOC to below the minimum SOC for a next heating cycle, the low state of charge becomes the trigger event for the power-up sequence as described with regard to FIG. 2. In some examples, the auxiliary device can continue to draw power and operate as normal while the power-up sequence for the engine is performed.

In some examples, a minimum state of charge of the high voltage power source is modified to enable the next heating cycle as described herein. In some examples, the modifying comprises elevating a minimum amount of charge to be held within the high voltage power source.

Figure 4:
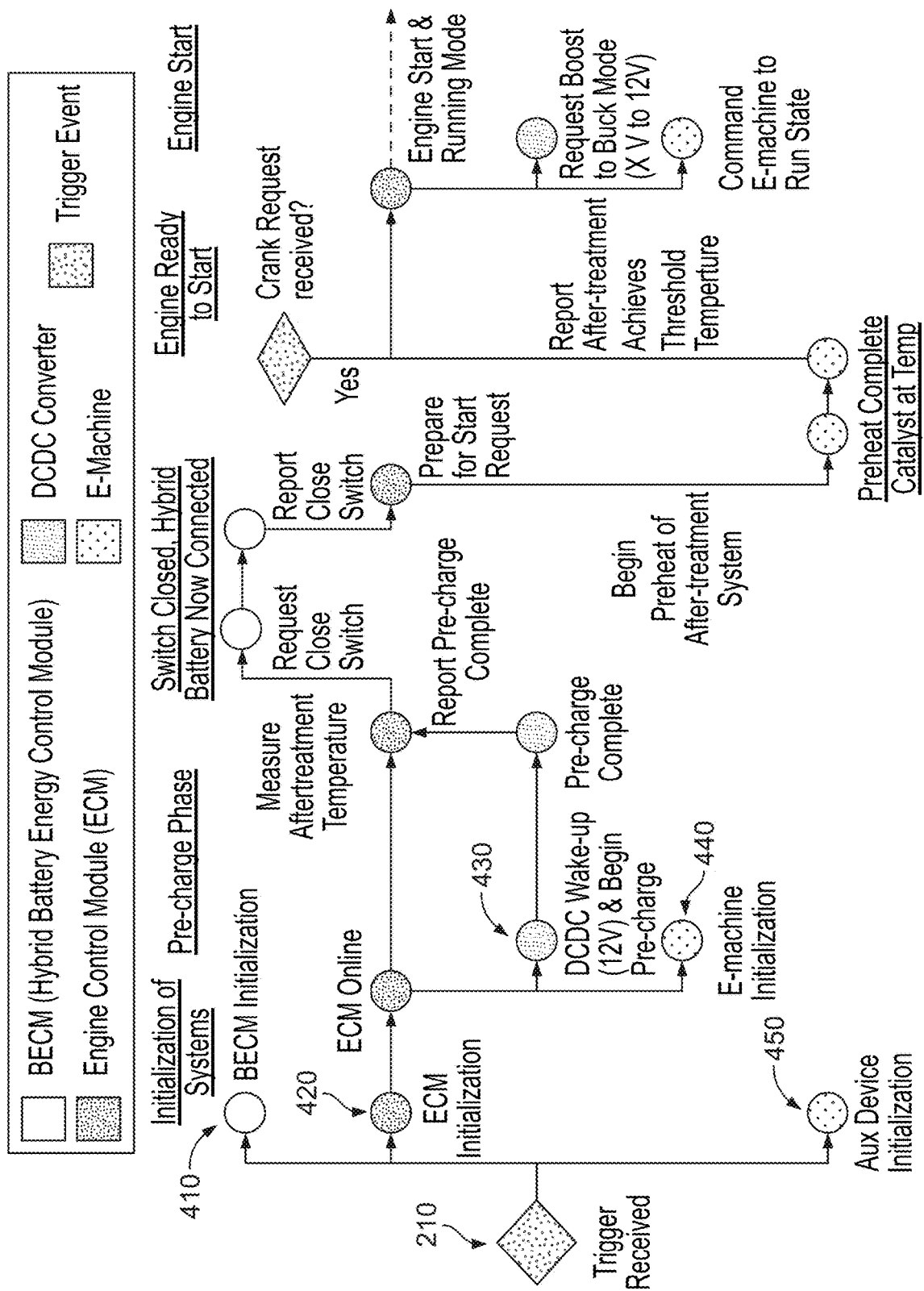
FIG. 4. illustrates an example hybrid system power-up sequence, in accordance with at least one of the examples described herein.

FIG. 4. illustrates an example hybrid system power-up sequence 400, in accordance with at least one of the examples described herein. As shown, a trigger event 210 is received. The trigger event 210 begins with the initialization of the individual systems of the hybrid vehicle architecture. In some examples, the systems present in the hybrid vehicle are the hybrid BECM 410, the engine control module (ECM) 420, the DC-DC converter 430, the e-machine 440, a device 450 connected to the high voltage power source. In some examples, the BECM 410 and ECM 420 may be the energy control module 240 and control module 220, respectively. In some examples, the power-up sequence described with reference to FIGS. 2 & 3 may be thought of simple exemplary examples of the exemplary power-up sequence 400.

In some examples, device 450 connected to the high voltage power source is the heating element for the after-treatment system. In some examples, device 450 connected to the high voltage power source is an inverter to provide electrical power to external devices, such as power tools or domestic appliances. In some examples, one or more systems are initialized in parallel. For example, the BECM 410 and the ECM 420 may be initialized in parallel, in response to the trigger event being received. In some examples, at least two or more of: the BECM 410; auxiliary device connected to the high voltage power source 450; an e-machine 440; the engine control module 420; or DC-DC converter 430 may be initialized in parallel, in any combination.

Returning to FIG. 4, when the ECM 420 is online, the pre-charge phase begins. In this phase, the ECM 420 sends a signal to the DC-DC converter 430 to begin a pre-charge. In some examples, the DC-DC converter 430 is woken first then instructed to begin pre-charge. In addition, the ECM 420 sends a signal to the e-machine 440 to also begin initialization. In some examples, the e-machine 440 may also be initialized in response to the trigger event 210. In some examples, after the pre-charge is completed, the DC-DC converter 430 signals to the ECM 420 that the pre-charge is complete. After the completion of the pre-charge of the DC-DC converter 430, the ECM 420 determines the temperature of the after-treatment system. In some examples, after determining that the after-treatment system is below a threshold temperature, the ECM 420 signals to the BECM 410 to close the e-switch (e.g., a solid-state based relay switch). In some examples, the BECM 410 reports the switch is closed and that the hybrid battery is now connected to the high voltage electrical bus terminal. In this way, the high voltage power source has been brought online prior to the engine start.

After the high voltage power source is connected to the bus, the ECM 420 signals to the auxiliary heat source connected to the auxiliary power source 450 to begin the heating cycle of the after-treatment system. In some examples, the after-treatment system may continuously report back to the ECM 420 data on the current heat cycle, including, but not limited to, information regarding the start temperature of the after-treatment system, the current temperature of the after-treatment system, delivered power to the after-treatment system, an expected time to reach a threshold temperature, an ambient temperature, a delta temperature between the ambient temperature and the after-treatment system. After the after-treatment system reaches the threshold temperature, a signal is sent to the ECM 420. In some examples, in parallel to the heating cycle of the after-treatment system, the ECM 420 is preparing for an engine start, which may include initializing and engaging a starter motor to crank the engine. In this way, the auxiliary power from the hybrid battery is provided before the engine has been started and nominal running mode has taken place.

After the after-treatment system is at the threshold temperature, and a request to crank the engine has been received, then the ECM 420 starts the engine. In some examples, the engine start phase comprises a number of steps that may be performed linearly or in parallel. For example, the ECM 420 may request the DC-DC converter 430 to change from boost to buck mode (e.g., from a typical hybrid system voltage boost down to low voltage, 12V, buck), and also command the e-machine to nominal run state.

In some examples, the hybrid power source also requires a modification to the reserved power, or state of charge (SOC). In some examples, the modification comprises raising a minimum SOC at the end of a drive cycle or heating cycle to guarantee the power source can support a next heating cycle. In some examples, the modified minimum SOC can be dynamically altered based on a number of contextual factors. In some examples, the contextual factors comprise an ambient temperature, a time since a last engine start-up, a delta temperature between the temperature of the after-treatment system and the ambient temperature, an engine temperature, a maximum power output from the auxiliary heat source, a maximum thermal energy output from the heat source, a target temperature for the after-treatment system, or a state of charge of the power source.

Figure 5:
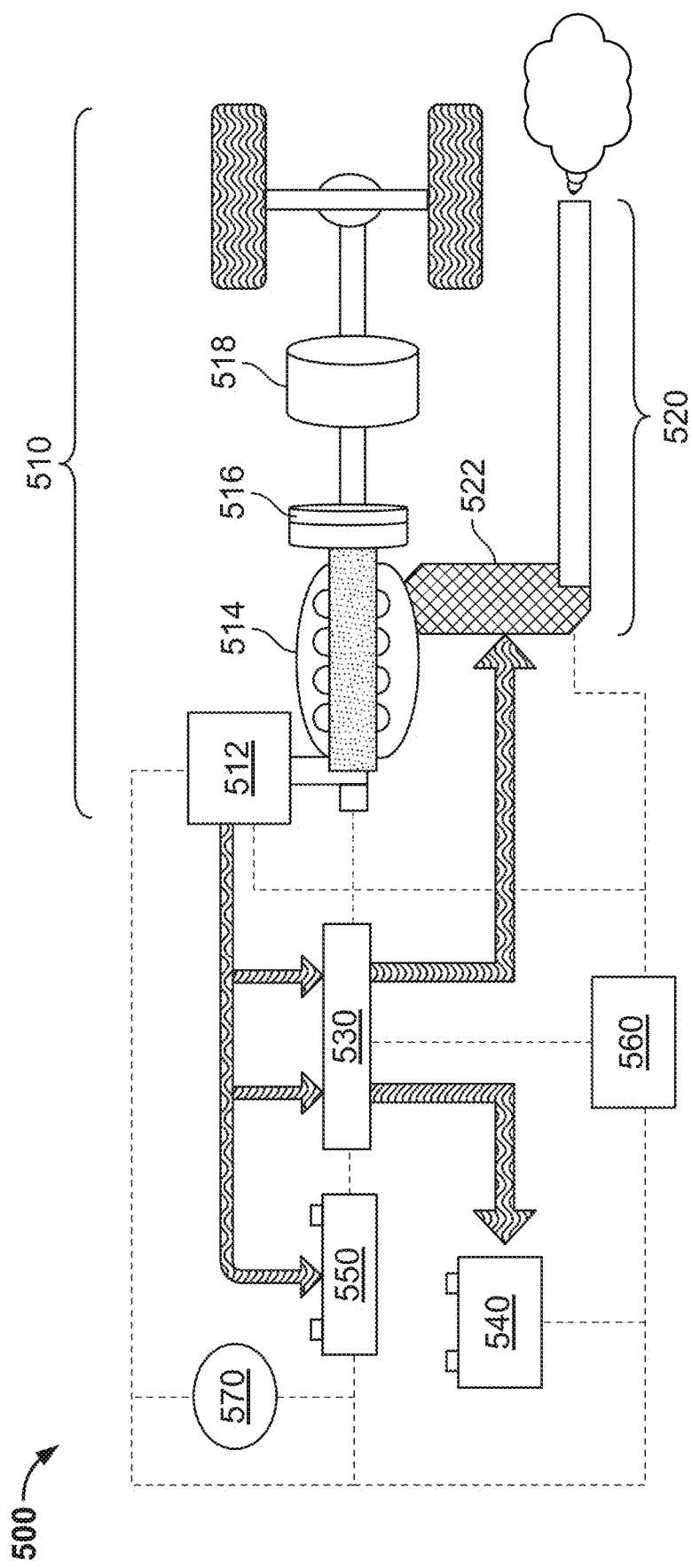
FIG. 5 illustrates an electrical power control system for a hybrid vehicle, in accordance with at least one of the examples described herein.

FIG. 5 shows a block diagram representing an electrical power control system 500 for a hybrid vehicle. In the example shown in FIG. 5, the power control system 500 is for an exemplary mHEV system architecture, in accordance with at least one of the examples described herein. Shown in FIG. 5 is a belt-integrated starter-generator (BISG) 512, which is a device that may produce torque and assist the engine in reducing the amount of work it has to do, or, in some examples, apply negative torque to recover energy in the system. Colloquially, the BISG 512 may be referred to as a motor-generator. The BISG 512 is integrated into the drive train 510, along with engine 514, clutch 516, and transmission 518. In some examples, the BISG 512 replaces a conventional non-hybrid engine's low voltage (e.g., 12V) alternator. In some examples, the BISG 512 transmits torque to the engine's crankshaft when it's operating as a hybrid drive motor, and the crankshaft transmits torque back to the BISG 512 when it operates as a generator, converting kinetic energy from the moving vehicle back into electricity, operating as a conventional alternator.

In some examples, the engine 514 has an exhaust system 520 comprising an eCAT 522. The eCAT 522 may be an eCAT with a start-up sequence, and heating cycle, as described herein. In some examples, the eCAT is electrically connected to a DC-DC converter 530. In some examples, the DC-DC converter 530 provides 0-48V and 0-4 kW to the eCAT 522. In the example shown in FIG. 5, the DC-DC converter 530 is also electrically connected to a low voltage (e.g., 12V) battery and bus 540, which is configured to supply electrical power to one or more low voltage accessories of the vehicle. In some examples, the DC-DC converter 530 may be a separate DC-DC converter, i.e. a second DC-DC converter, separate to the DC-DC converter that is already part of a typical hybrid vehicle system. In some examples, the DC-DC converter 530 is integrated into the typical DC-DC converter found in HEVs (e.g., a 48 v to 12 v DC-DC converter) to support the 12V vehicle system. In this way, there is provided a single DC-DC converter 530 unit, with two outputs, one to the 12V system and one to the eCAT 522 (of varied voltage). In some examples, the eCAT 522 is electrically connected to a PWM switch, the PWM switch is controlled by an engine control module (ECM), and the PWM switch is configured to modulate the power provided to the eCAT 522 or engine after-treatment system, as described above.

In the example shown in FIG. 5, the power control system 500 comprises a controller 560, e.g., an engine control module (ECM), in operational communication with each of the BISG 512, the engine 514, the DC-DC converter 530, and the eCAT 522, the low voltage battery and bus 540, the high voltage battery and bus 550 (e.g., a HEV power system), and a pump 570. The pump 570 may be used to pump fluids such as air through the engine and exhaust system. In some examples, the pump is fluidly connected to the engine exhaust system to draw air from the atmosphere through the eCAT 522 to transfer thermal energy from the heating elements in the eCAT 522 to the catalyst.

The present disclosure is not limited to the set-up shown in FIG. 5. For example, the controller 560 may be a stand-alone controller, or any other appropriate controller of the hybrid vehicle. For example, the controller may, at least in part, be integrated with another controller of the vehicle, such as a controller of the DC-DC converter 530. Furthermore, the controller 560 may be configured to operationally communicate with anyone or more of the vehicle components shown in FIG. 5, and/or any other appropriate components of the vehicle. For example, controller 560 may be a stand-alone controller configured to operationally communicate with at least one high voltage accessory, an electric motor-generator, and an eCAT, to control the electrical power output of the high voltage battery 550.

While the example shown in FIG. 5 exemplifies the use of the control system 500 for an mHEV, it is understood that the control system 500 may be implemented on an appropriate type of hybrid vehicle, such as a plug-in hybrid electric vehicle (PHEV), having one or more high voltage circuit components and an eCAT. System 500 shown in FIG. 5 is configured to supply the electrical power output of a high voltage battery 550 of a hybrid vehicle to the eCAT 522, prior to the engine 514 being cranked, as described with reference to FIG. 4 above.

Figure 6:
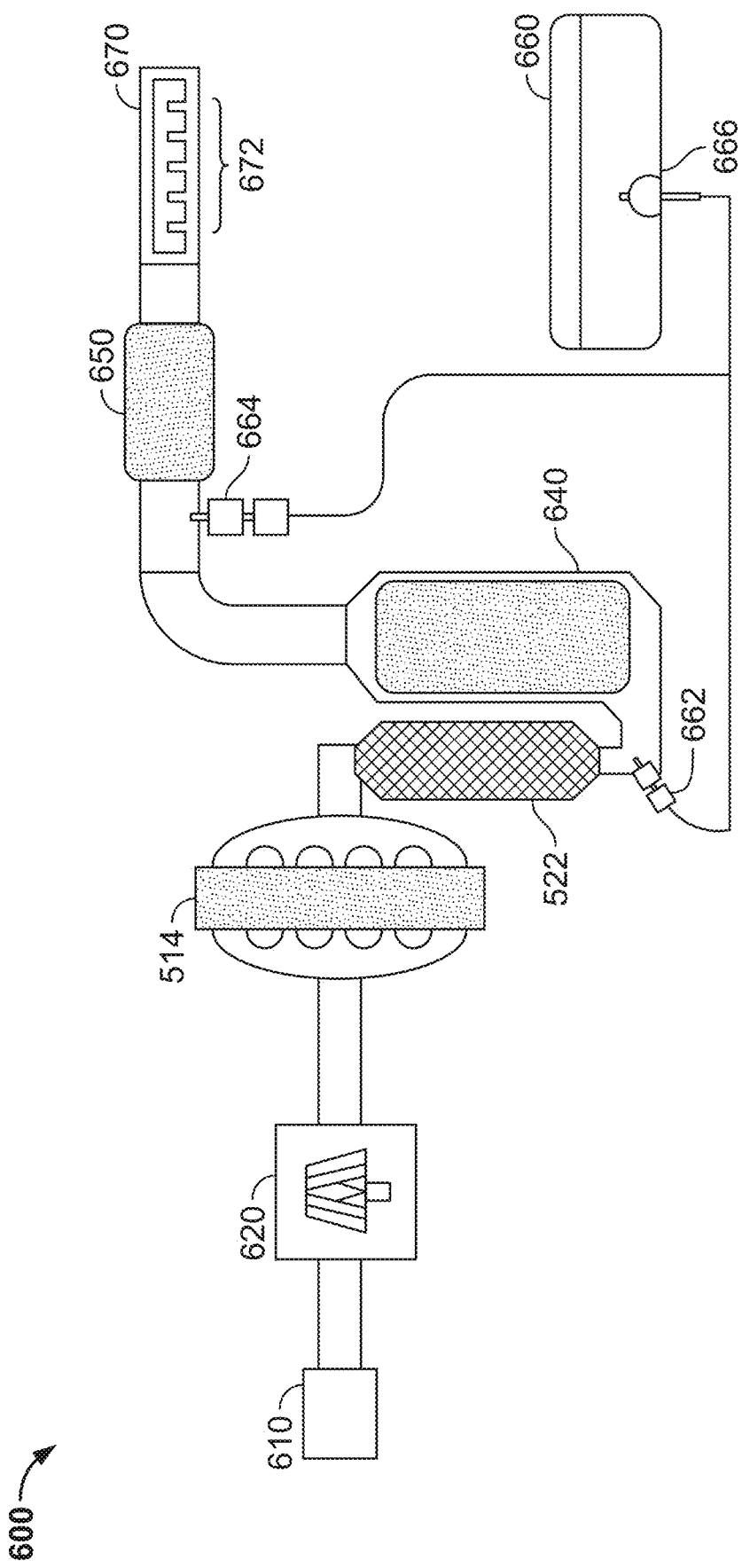
FIG. 6 illustrates an exemplary exhaust system comprising an engine and after-treatment system, in accordance with at least one of the examples described herein.

FIG. 6 illustrates an exemplary exhaust system 600 comprising an engine 514 and an after-treatment system, such as an eCAT 522, in accordance with at least one of the examples described herein. In some examples, and as shown in FIG. 6, there is provided an air-box 610 connected to a compressor 620 to draw air from the atmosphere. The airbox and compressor are fluidly connected to engine 514 and after-treatment system 522 to transfer thermal energy from the heating element disposed within the after-treatment system 522 to the rest of the after-treatment system 522 (e.g., from the eCAT to the catalyst).

In some examples, there is a diesel particulate filter 640 downstream of the after-treatment system 522. A diesel particulate filter (DPF) is a filter that captures and stores exhaust soot and is also itself an after-treatment utilized to reduce emissions from diesel cars. DPFs have a finite capacity, the trapped soot periodically has to be emptied or 'burned off' to regenerate the DPF. This regeneration process cleanly burns off the excess soot deposited in the filter, reducing the harmful exhaust emission.

In some examples, there is also provided a Selective Catalytic Reduction (SCR) 650 system. An SCR is another emissions control technology system that injects a liquid-reductant agent through a special catalyst into the exhaust stream of engines, in particular diesel engines. The reductant source is usually automotive-grade urea, otherwise known as Diesel Exhaust Fluid (DEF). The DEF sets off a chemical reaction that converts nitrogen oxides into nitrogen, water, and low amounts of carbon dioxide ($CO_2$), which is then expelled through the vehicle tailpipe 670. The DEF may be stored in a DEF tank 660. The DEF may be distributed through a number of pumps and valves 662-666, as shown in FIG. 6.

In some examples, the exhaust system comprises a number of sensors 672 to detect the flue gas containing Oxides of Nitrogen (NOx) and Oxides of Sulphur (SOx), to ensure the final emissions are within a regulation amount. Euro 5 exhaust emission legislation and Euro 6 exhaust emission legislation, have effectively made DPFs, DEF, and SCRs mandatory to meet the emissions standards. However, future emission legislation, such as Euro 7, such technology along will not be sufficient. The systems and embodiments described herein may replace, or work in conjunction with DPFs, DEF, and SCRs and meet the future standards.

Figure 7:
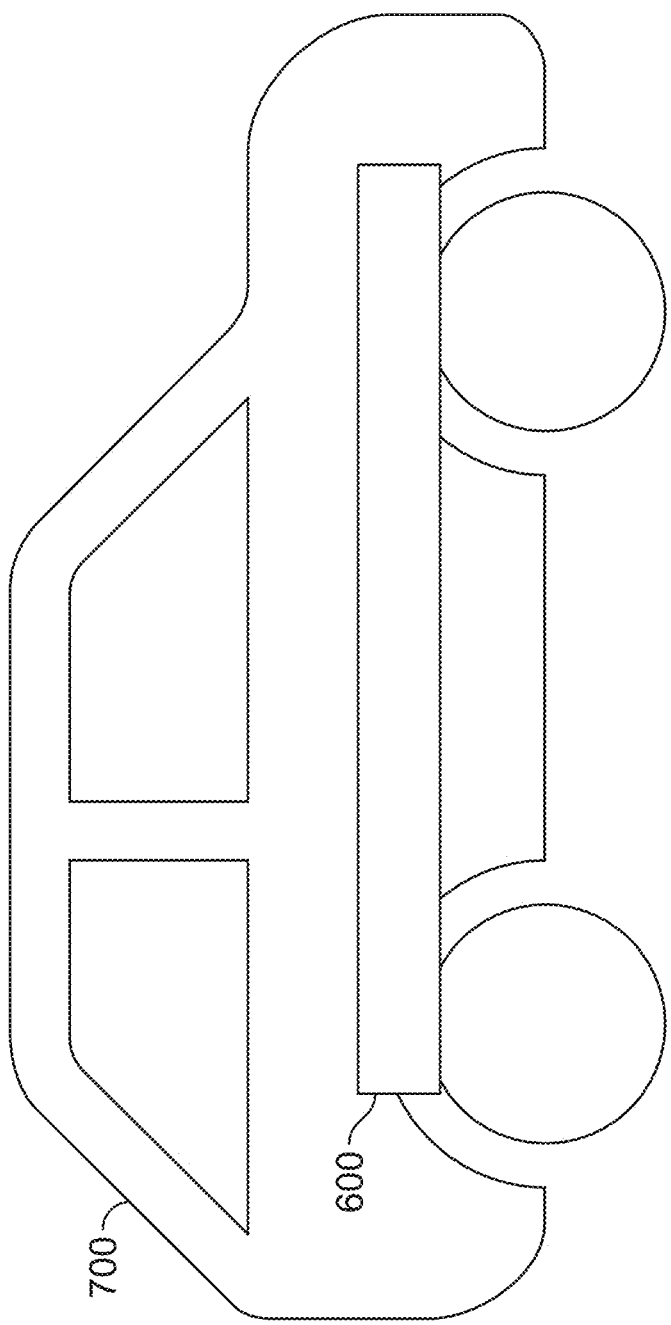
FIG. 7 illustrates a vehicle comprising an engine and an exemplary exhaust system, in accordance with at least one of the examples described herein.

FIG. 7 illustrates a vehicle 700 comprising an engine and an exemplary exhaust system 600, in accordance with at least one of the examples described herein. According to some examples there is provided a vehicle 700 comprising an engine exhaust system 600 as described with reference to FIG. 6. In some examples, the vehicle further comprises a drive train 510 comprising a BISG 512, an engine 514, clutch 516, and transmission 518. The exhaust system 600 may comprise an eCAT as described above.

It should be understood that the examples described above are not mutually exclusive with any of the other examples described with reference to FIGS. 1-7. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made to illustrate the general principles of the systems and processes discussed above and are intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, it shall be appreciated that the invention is not limited thereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method of providing a heating cycle for an after-treatment system of a vehicle, the method comprising:
   receiving a start trigger;
   initiating a pre-charge cycle of a DC-DC converter;
   determining a temperature of the after-treatment system;
   in response to determining that the temperature of the after-treatment system is below a threshold temperature and determining that the pre-charge cycle is complete, operating a solid-state switch to electrically connect a high voltage power source to a heating element of the after-treatment system; and
   heating the after-treatment system using the heating element until the after-treatment system reaches the threshold temperature.

2. The method of claim 1, the method further comprising:
   starting an engine;
   wherein the engine is started after the after-treatment system reaches the threshold temperature.

3. The method of claim 1, the method further comprising:
   closing an e-switch of the power source to electrically connect the power source to the after-treatment system, wherein the after-treatment system further comprises a pulse-width modulation, PWM, switch and/or an additional DC-DC converter.

4. The method of claim 1, further comprising providing power to an auxiliary system before an engine start.

5. The method of claim 1, wherein the start trigger comprises:
   a signal received from a key fob;
   a door of a vehicle opening;
   a signal received from a smart device application;
   a signal received from an auxiliary device connected to the power source;
   an engine start request; or
   detecting a proximity of a user.

6. The method of claim 1, further comprising determining a plurality of contextual factors.

7. The method of claim 6, wherein an amount of thermal energy provided to the after-treatment system by the heating element is based on the contextual factors.

8. The method of claim 6, wherein the contextual factors comprise at least one of:
   an ambient temperature;
   a time since a last engine start-up;
   a delta temperature between the temperature of the after-treatment system and the ambient temperature;
   an engine temperature;
   a maximum power output from the auxiliary heat source;
   a maximum thermal energy output from the heat source;
   a target temperature for the after-treatment system; or
   a state of charge of the power source.

9. The method of claim 1, further comprising:
   determining a state of charge of the high voltage power source.

10. The method of claim 9, further comprising:
    modifying a minimum state of charge of the high voltage power source to enable a next heating cycle.

11. The method of claim 10, wherein the modifying comprises elevating a minimum amount of charge to be held within the high voltage power source.

12. The method of claim 1, further comprising, in response to receiving the start trigger, initializing at least one of:
    a battery energy control module;
    an auxiliary device connected to a high voltage power source;
    an e-machine; or
    an engine control module.

13. The method of claim 12, further comprising initializing two or more systems in parallel.

14. The method of claim 1, further comprising, in response to the after-treatment system reaching a target temperature, starting an engine.

15. An exhaust system suitable for use with an engine, the engine exhaust system comprising:
    an engine after-treatment system disposed within the exhaust system;
    an exhaust control module configured to:
      receive a start trigger;
      initiate a pre-charge cycle of a DCDC converter;
      determine a temperature of the after-treatment system;
      in response to determining that the temperature of the after-treatment system is below a threshold temperature and determining the pre-charge is complete, operate a solid-state switch to electrically connect a high voltage power source to a heating element of the after-treatment system; and
      heat the after-treatment system using the heating element until the after-treatment system reaches the threshold temperature.

16. A vehicle comprising:
    an engine; and
    the engine exhaust system for use with the engine, the engine exhaust system comprising:
      an engine after-treatment system disposed within the exhaust system;
      an exhaust control module configured to:
        receive a start trigger;
        initiate a pre-charge cycle of a DCDC converter;
        determine a temperature of the after-treatment system;
        in response to determining that the temperature of the after-treatment system is below a threshold temperature and determining the pre-charge is complete, operate a solid-state switch to electrically connect a high voltage power source to a heating element of the after-treatment system; and
        heat the after-treatment system using the heating element until the after-treatment system reaches the threshold temperature.

17. A non-transitory computer-readable medium having instructions encoded thereon for carrying out a method, the method comprising:
    receiving a start trigger;
    initiating a pre-charge cycle of a DCDC converter;
    determining a temperature of the after-treatment system;
    in response to determining that the temperature of the after-treatment system is below a threshold temperature and determining that the pre-charge cycle is complete, operating a solid-state switch to electrically connect a high voltage power source to a heating element of the after-treatment system; and heating the after-treatment system using the heating element until the after-treatment system reaches the threshold temperature.

\* \* \* \* \*